United States Patent
Chawathe et al.

(10) Patent No.: US 9,201,898 B2
(45) Date of Patent: Dec. 1, 2015

(54) EFFICIENT FETCHING OF MAP TILE DATA

(71) Applicant: GOOGLE INC., Mountain View, CA (US)

(72) Inventors: Yatin Chawathe, Mountain View, CA (US); Nicholas Lee, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 195 days.

(21) Appl. No.: 13/895,301

(22) Filed: May 15, 2013

(65) Prior Publication Data

US 2014/0344296 A1  Nov. 20, 2014

(51) Int. Cl.
*G06F 17/30* (2006.01)
*G06F 7/00* (2006.01)

(52) U.S. Cl.
CPC ...... *G06F 17/30241* (2013.01); *G06F 17/3087* (2013.01); *G06F 17/30902* (2013.01)

(58) Field of Classification Search
CPC ................. G06F 17/30997; H04L 41/0226
USPC .................................................. 707/755, 683
See application file for complete search history.

(56) References Cited

U.S. PATENT DOCUMENTS

| | | | | |
|---|---|---|---|---|
| 5,902,347 A * | 5/1999 | Backman et al. | ............. | 701/455 |
| 5,977,988 A * | 11/1999 | Greene | ............. | 345/443 |
| 6,072,507 A * | 6/2000 | Balatsos et al. | ............. | 345/569 |
| 6,415,227 B1 * | 7/2002 | Lin | ............. | 701/455 |
| 6,430,501 B1 * | 8/2002 | Slominski | ............. | 701/429 |
| 6,667,745 B1 * | 12/2003 | Hussain | ............. | 345/545 |
| 7,158,878 B2 | 1/2007 | Rasmussen et al. | | |
| 7,551,182 B2 | 6/2009 | Bethune et al. | | |
| 7,734,412 B2 | 6/2010 | Shi et al. | | |
| 7,962,281 B2 | 6/2011 | Rasmussen et al. | | |
| 8,130,245 B2 | 3/2012 | Ham et al. | | |
| 8,204,966 B1 | 6/2012 | Mendis et al. | | |
| 8,244,770 B2 * | 8/2012 | Turner et al. | ............. | 707/796 |
| 2002/0116593 A1 * | 8/2002 | Kazar et al. | ............. | 711/202 |
| 2007/0233817 A1 * | 10/2007 | Johnson et al. | ............. | 709/219 |
| 2008/0059889 A1 * | 3/2008 | Parker et al. | ............. | 715/748 |
| 2012/0238250 A1 * | 9/2012 | Iwuchukwu | ............. | 455/414.1 |
| 2012/0284346 A1 | 11/2012 | Brown et al. | | |
| 2013/0124563 A1 | 5/2013 | CaveLie et al. | | |
| 2013/0147846 A1 | 6/2013 | Kalai et al. | | |

OTHER PUBLICATIONS

International Search Report and Written Opinion for Application No. PCT/US2014/038069, dated Sep. 16, 2014.

* cited by examiner

*Primary Examiner* — Pavan Mamillapalli
(74) *Attorney, Agent, or Firm* — Marshall, Gerstein & Borun LLP

(57) ABSTRACT

A method for efficiently fetching map tiles for digital maps includes receiving, at a client device such as a mapping user interface device, a request to display a digital map and identifying a plurality of map tiles for the request, each map tile representing a portion of the digital map. The user interface device generates a single map content request including multiple identifiers corresponding to the plurality of map tiles. The user interface device then sends the map content request to a map content server as a single request requesting multiple map tiles. In response to the map content request, the map content server retrieves the plurality of map tiles from a content database and sends the plurality of map tiles to the client device. The client device can then display the digital map based on the plurality of map tiles.

29 Claims, 6 Drawing Sheets

EFFICIENT FETCHING OF MAP TILE DATA

FIELD OF TECHNOLOGY

The present disclosure relates generally to displaying digital maps on client devices, and, more particularly, to requesting and retrieving map content for displaying digital maps.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Digital maps are often generated by assembling a set of map tiles (e.g. 256 by 256 pixel images). The content of the map tiles can include shading, colors, roads, navigation routes, label, markers, building footprints, etc. in either raster, vector, or combined image formats. Upon receiving a geographic query or other input from a user, a mapping application identifies relevant map tiles needed to assemble a digital map and requests the necessary map tiles from a server (i.e. the mapping application "fetches" the map tiles).

Currently, a browser or a mapping application fetches every map tile separately via individual hypertext transfer protocol (HTTP) requests for each rectangular portion of a digital map displayed in a map viewport. However, a typical browser can only have a limited number of concurrently outstanding HTTP requests. Moreover, sending out a request for each map tile adds a significant amount of communication overhead to the transmission of map data.

SUMMARY

The techniques of this disclosure allow map tiles, needed for the assembly a digital map, to be fetched more efficiently from a map content server by grouping together requests for various different map tiles of a digital map to be displayed into a single content request also referred to herein as a "multi-tile" request. A single content request to the map content server may include an identification of multiple map tiles, such that multiple map tiles are fetched without the need for multiple content requests. The map tiles identified in the multi-tile content request typically make up a contiguous portion of the digital map. However, any set of map tiles may be fetched by sending a multi-tile request to the server, where the multi-tile request includes an identification of a reference map tile and an identification of multiple other map tiles relative to the reference map tile.

According to one implementation, a computer-implemented method for fetching map tiles for digital maps comprises receiving, via a user interface, a request to display a digital map, identifying, with a processor, a plurality of map tiles each representing a portion of the digital map, and generating a single map content request including multiple identifiers corresponding to the plurality of map tiles. Further, the method comprises communicating, via a computer network, the map content request to a server, in response to the map content request, receiving, via the computer network, the plurality of map tiles from the server, and displaying, via the user interface, the digital map based on the plurality of map tiles.

According to another implementation, a computer device for efficiently fetching map tiles comprises one or more processors and one or more memories coupled to the one or more processors, wherein the one or more memories include computer executable instructions stored therein that, when executed by the one or more processors, cause the one or more processors to receive, via a user interface, a request to display a digital map. Further, the one or more processors identify a plurality of map tiles each representing a portion of the digital map, generate a single map content request including multiple identifiers corresponding to the plurality of map tiles, and communicate, via a computer network, the map content request to a server. In response to the map content request, the one or more processors receive, via the computer network, the plurality of map tiles from the server and display, via the user interface, the digital map based on the plurality of map tiles According to yet another implementation, a method in a network device for retrieving map tiles comprises receiving, from a client device, a request for map data including a plurality of map tiles, wherein the request for map data includes multiple identifiers corresponding to the plurality of map tiles. Further, the method comprises parsing, with one or more processors, the request for map data to identify the plurality of map tiles based on the unique identifier and the set of relative identifiers, retrieving, with the one or more processors, the plurality of map tiles from a map content database, and providing the requested map tiles to the client device.

According to yet another implementation, computer device for efficiently fetching retrieving map tiles comprises one or more processors and one or more memories coupled to the one or more processors, wherein the one or more memories include computer executable instructions stored therein that, when executed by the one or more processors, cause the one or more processors to receive, from a client device, a request for map data including multiple identifiers corresponding to the plurality of map tiles. Further, the one or more processors parse the request for map data to identify the plurality of map tiles based on the unique identification and the set of relative identifications, retrieve the plurality of map tiles from a map content database, and provide the requested map tiles to the client device.

According to still another implementation, a device includes a means for receiving, via a user interface, a request to display a digital map; a means for identifying, with a processor, a plurality of map tiles each representing a portion of the digital map; a means for generating a single map content request including multiple identifiers corresponding to the plurality of map tiles; a means for communicating, via a computer network, the map content request to a server; a means for, in response to the map content request, receiving, via the computer network, the plurality of map tiles from the server; and a means for displaying, via the user interface, the digital map based on the plurality of map tiles.

DETAILED DESCRIPTION

The techniques of this disclosure allow map tiles, needed for the assembly of digital maps, to be fetched efficiently from a map content server. A single content request to the map content server includes an identification of multiple map tiles, such that multiple map tiles are fetched without the need for multiple content requests. The map tiles identified in the multi-tile content request typically make up a contiguous portion of the digital map. However, any set of map tiles may be fetched by sending a multi-tile request to the server, where the multi-tile request includes an identification of multiple map tiles. In some cases, each map tile identification may be a complete or unique identification. However, in other cases, the multi-tile request may include a full or complete identification of one of the map tiles in the multi-tile request and may include abbreviated or indexed identifications for other map tiles in the multi-tile request, wherein the indexed tile identifications are referenced to the tile for which a complete identification is provided for example, to reduce the amount of communications needed to request all of the map tiles.

Figure 1:
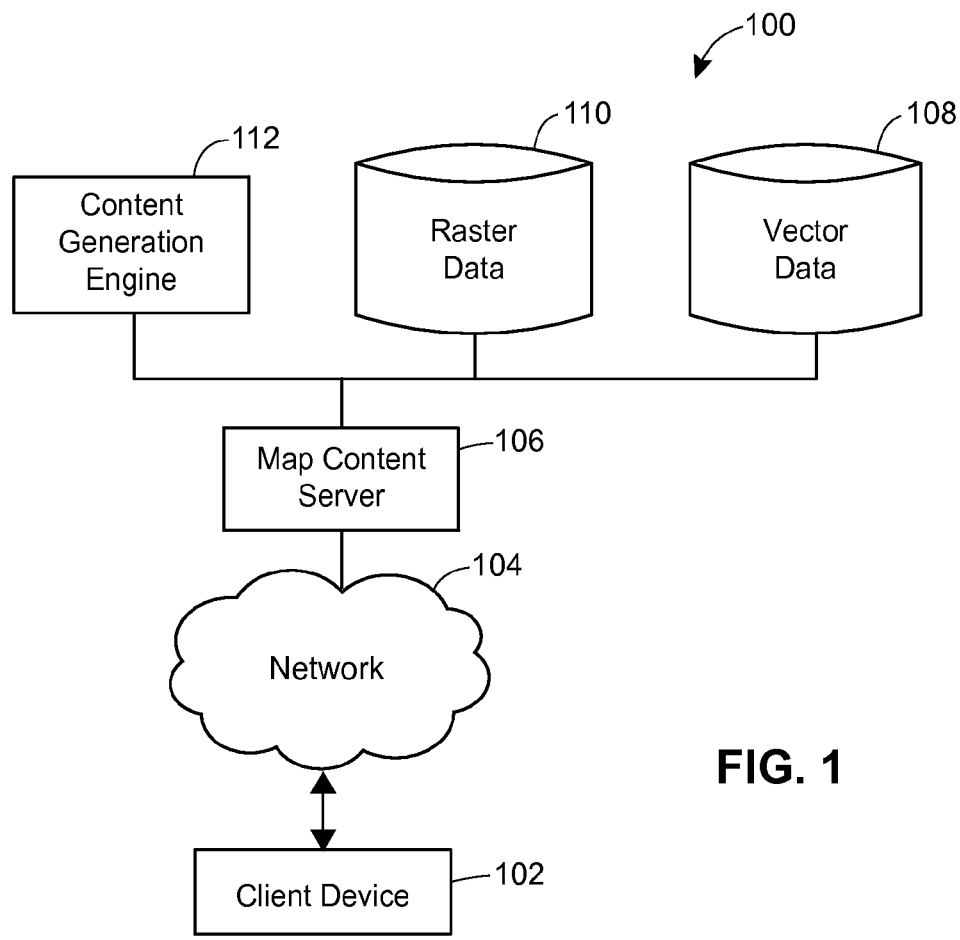
FIG. 1 illustrates an example computing environment in which map tiles can be efficiently fetched for displaying digital maps.

FIG. 1 illustrates an example computing environment 100 in which map tiles may be efficiently fetched via a multi-tile request. The example computing environment 100 includes a client device 102 communicatively coupled to the network 104. By way of example, the client device 102 may be a smartphone, tablet computer, laptop computer, desktop computer, geographic positioning system (GPS) receiver, etc., and further details of an example client device are discussed with reference to FIG. 2. The communications network 104 may include one or more of a local area network (LAN), a wireless LAN, a wide area network (WAN), a mobile communications network, the Internet, or any other suitable public or private wired or wireless communication network.

In some implementations, the client device 102 may execute a mapping application to display digital maps to a user, where the digital maps include map content downloaded from a map content server 106. For example, the mapping application may be available at an online application store disposed at the map content server 106 or an application server (not shown), for example. A user of the client device 102 may retrieve a copy of the mapping application from the application server and "install" the retrieved copy of the mapping application on the client device 102. Alternatively, the client device 102 may display an interactive mapping application within a web browser application.

In some scenarios, the client device 102 may display digital maps, constructed from a plurality of map tiles (e.g., 256 by 256 pixels images). For example, a user of the client device 102 may identify an area of interest via a geographic query, and the mapping application may display a digital map of the area of interest constructed from multiple rectangular map tiles each representing a rectangular portion of the area of interest. In order to service such client requests, the mapping application may fetch relevant map tiles via a multi-tile request, as discussed below.

In an implementation, a map tile, making up a portion of a digital map, may be generated by overlaying, blending, and/or otherwise combining: (i) vector graphics stored in a vector database 108, and (ii) background raster images stored in a background raster database 110. By way of example, the vector database 108 may include geometric definitions of building footprints, label/marker positions, road segments, navigation routes, etc. Background raster images may include raster images showing terrain information, smaller roads, residential subdivisions, etc., for example. In some implementations, vector graphics, background raster images, and the resulting map tiles are generated by a content generation engine 112. For example, the content generation engine 112 may generate map content (e.g. vector/raster images and map tiles) via batch processing, and the map content server 106 may retrieve the map content in real-time to service client requests. In other cases, a map tile may be made up entirely as a raster image or entirely as a vector graphics image.

Figure 2:
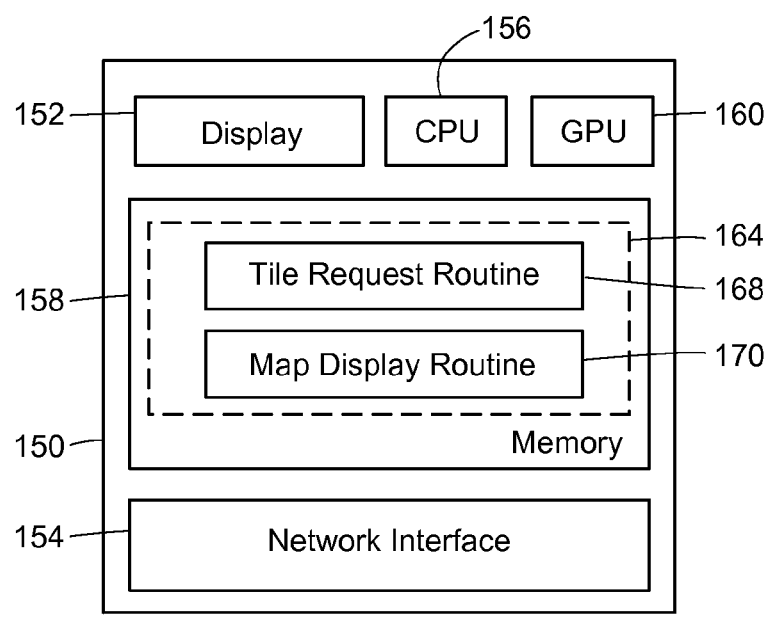
FIG. 2 illustrates an example client device which can generate multi-tile requests and can be implemented as part of the computing environment illustrated in FIG. 1.

FIG. 2 illustrates an example client device 150 which can efficiently fetch map tiles via multi-tile requests. The client device 150 includes a display device 152 on which digital maps may be displayed, such as a liquid crystal display (LCD), light emitting diode (LED) display, organic LED (OLED) display, etc. In addition, the client device 150 includes a network interface 154 to facilitate communications over a network, such as network 104, a CPU 156 for executing computer-readable instructions stored in a memory 158, and a graphics processing unit (GPU) 160 for rendering images to be displayed on the display device 152.

The memory 158 may include a mapping application 164, in some implementations. For example, the mapping application 164 may include a tile request routine 168 for generating multi-tile content requests and a map display routine 170 for constructing and displaying digital maps based on received map tiles. In some implementations, the memory 158 may also store a plurality of shaders (not shown) for describing and/or defining the traits (e.g. position, colors, etc.) of portions of images to be displayed on the display device 152. For example, the plurality of shaders may include pixel shaders, vertex shaders, geometry shaders, etc. which can be executed by the GPU 160. In other implementations, a plurality of shaders may be part of one or more shader "pipelines" in the GPU 160, as known in the industry, in an implementation.

Figure 3A:
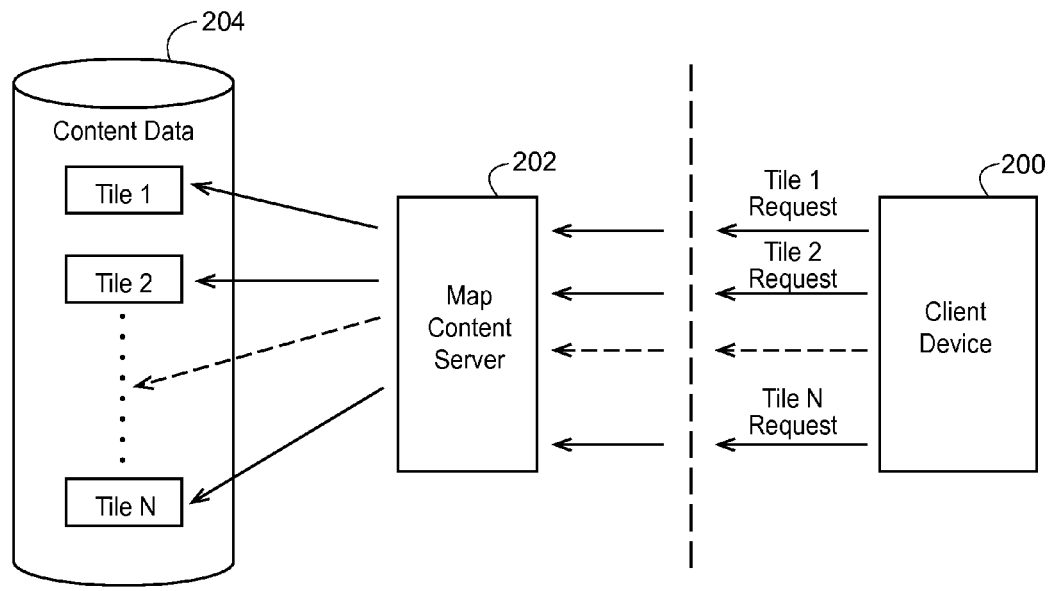
FIGS. 3A and 3B illustrate example implementations of existing techniques for fetching map tiles.
Figure 3B:
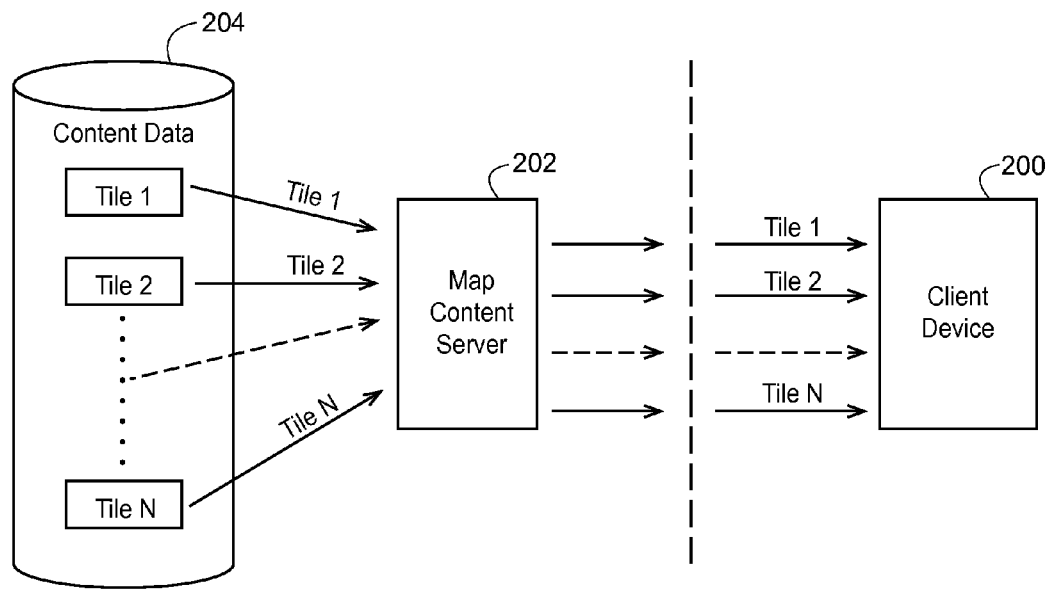

For clarity, FIGS. 3A and 3B illustrate an example implementation of existing map tile fetching techniques. In existing implementations, a content request, such as a hypertext transfer protocol (HTTP) request, is sent from a client device 200 to a map content server 202 for each map tile that is needed to construct a digital map (as illustrated by multiple arrows labeled Tile 1-Tile N). Subsequently, the map content server 202 retrieves map tiles 1-N from a content database 204 and sends each of the map tiles 1-N back to the client device 200 as they are received or generated, as illustrated by multiple arrows labeled Tile 1-Tile N in FIG. 3B. However, the use of multiple content requests in existing map fetching techniques results in a significant amount of communication overhead and/or queued or stalled content requests when the number of content requests exceeds browser limits.

In contrast, the techniques of the present disclosure can utilize a single content request to fetch multiple map tiles. As such, the techniques of the present disclosure may significantly reduce communication overhead and prevent queued or stalled content requests in many scenarios. Moreover, a single content request may reach a map content server faster than all of the set of multiple content requests reach the map content server, thus providing the map content server more timely notification of requested content and allowing the map content server to begin to fetch or generate all of the requested map tiles more quickly than if requests for individual map tiles are received in serially sent messages.

Figure 4:
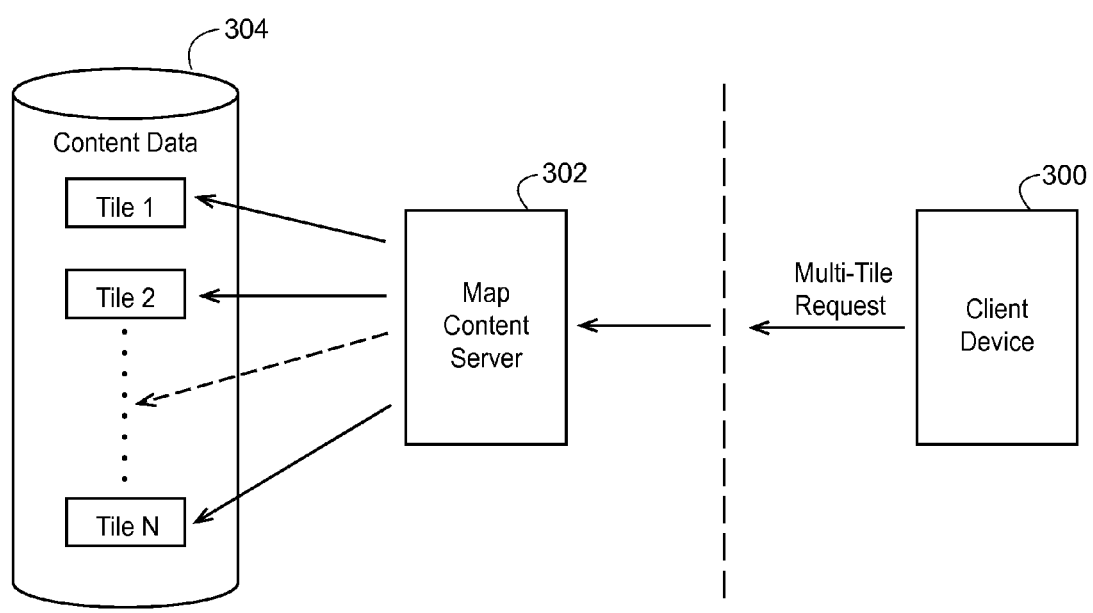
FIG. 4 illustrates an example implementation of a multi-tile request which can be implemented in the example computing environment illustrated in FIG. 1.

FIG. 4 illustrates an example implementation of the techniques of the present disclosure in which a single multi-tile request is utilized to fetch multiple map tiles. A client device 300 may identify (e.g. via a geographic queries or zoom operation) multiple map tiles needed to display new or different portions of a digital map, in an example scenario. In turn, the client device 300 may construct a multi-tile content request and send the request to a map content server 302 (as illustrated by a single arrow labeled "multi-tile request"), in the example scenario.

The map content server 302 may parse the multi-tile request to identify individual tiles requested by the client device 300 and retrieve the individual tiles (Tile 1-Tile N) from a content database 304, as illustrated by multiple arrows between the map content server 302 and the content database 304. The retrieved map tiles may be raster image map tiles, stored, for example, in raster database 110, or vector graphics map tiles, stored, for example, in vector database 108 (of FIG. 1). Thus, multiple map tiles are fetched without the need for multiple content requests, in the implementation. The map content server may still send each retrieved or fetched map tile back to the client device in a separate message as these tiles are fetched, to assure that the tiles are sent to and received by the client device as quickly as possible.

Figure 5:
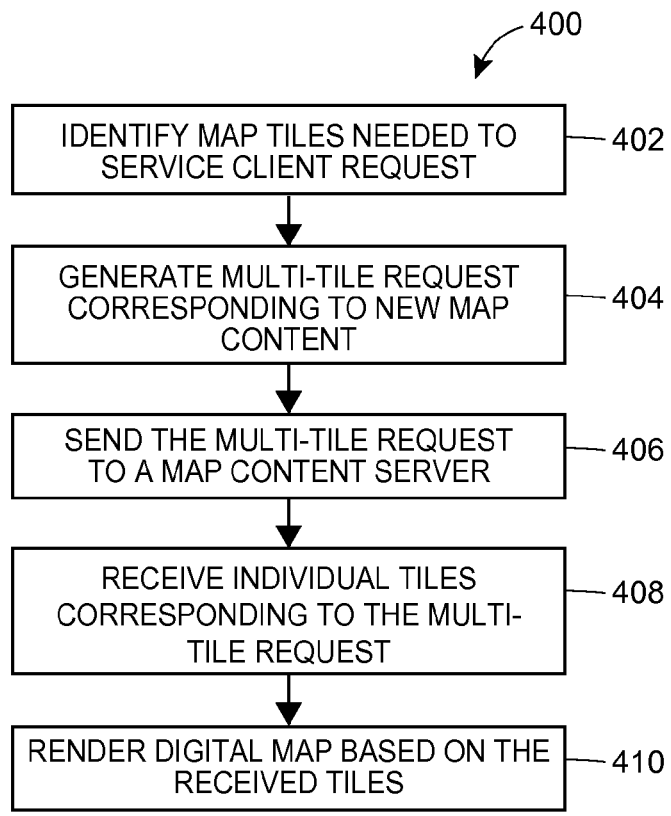
FIG. 5 is a flow diagram of an example method for efficient fetching of map tiles which can be implemented in the example computing environment illustrated in FIG. 1.

FIG. 5 is a flow diagram of an example method 400 for fetching map tiles via a multi-tile request. The method 400 may be implemented in the client device 102, for example. At block 402, a set of map tiles, needed to assemble a digital map, is identified. In some implementations, the set of map tiles is identified in response to a geographic query. For example, a user of the client device 102 may enter, via a keyboard, touchscreen, or other user interface, an indication of an area of interest, and the client device 102 may identify a set of map tiles corresponding to that area of interest. Alternatively, a user of the client device 102 may perform a zoom operation, miscellaneous content selection (e.g. selection indicating the display of traffic information), or other operation that requires additional map content identified as a set of new map tiles.

Next (at a block 404), the client device generates a multi-tile request, where the multi-tile request includes an identifier of each of the set of map tiles, needed to construct a digital map. In some implementations, the multi-tile request may specify a reference map tile in absolute terms (e.g., using x and y coordinates, latitude/longitude coordinates, map tile identifier numbers, or any other full or complete identification methodology that uniquely identifies a map tile) and specify the remaining tiles in relative terms. For example, the multi-tile request may specify the tile (132, 124) and list the adjacent tiles as having coordinates (+1, 0), (+2, 0), . . . (+1, +1), (+2, +1), . . . . , all measured relative to (132, 124). If desired, the multi-tile request may also specify a map tile in absolute terms and a bounding box in any suitable format (e.g., all adjacent tiles, five tiles down, 10 tiles to the right), so that the server can provide all the tiles that belong to the bounding box. In this manner, the current two thousand character limit of a uniform resource locator (URL), used in HTTP requests, will not prevent the client device from requesting a large number of tiles in a single request, in an implementation.

Further details of a method for generating and sending multi-tile requests are described with reference to FIG. 7

Figure 6:
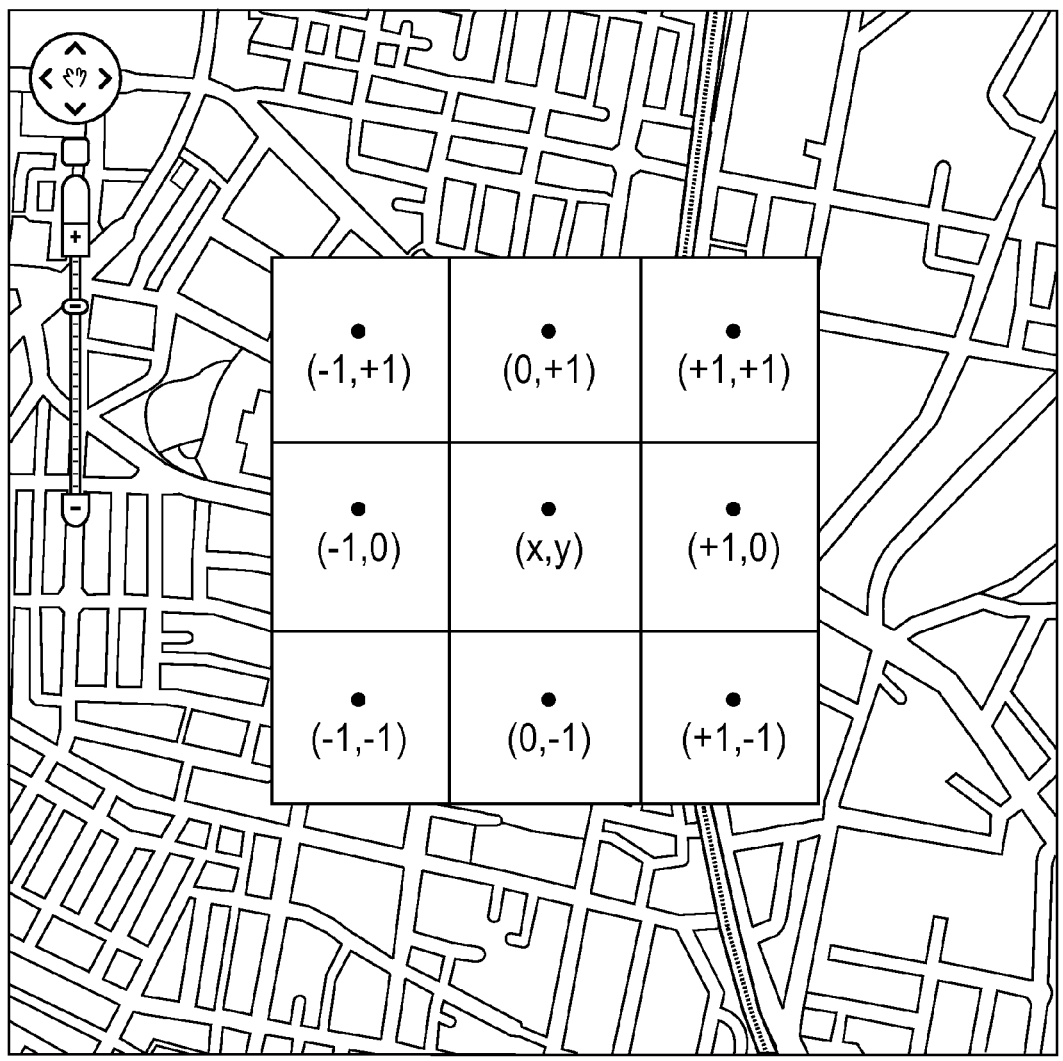
FIG. 6 illustrates an example labeling or indexing scheme for map tiles which can be implemented as part of the example method of FIG. 5.

For clarity, FIG. 6 illustrates an example set of map tiles including a reference map tile and surrounding map tiles specified by relative coordinates. In the example set of map tiles, the reference map is labeled by the coordinates (x, y) and the surrounding map tiles are labeled in increments of the map tile size. For example, the map tile directly on the right hand side of the reference map tile is labeled by the coordinates (+1, 0), whereas the map tile directly above the reference map tile is labeled by the coordinates (0,+1). In such a way, a set of map tiles may be indentified in a multi-tile request via relative coordinates. While not illustrated in FIG. 6, the reference map tile identifier may also including other information such as the zoom level for the map tile, a map view associated with the requested map tile, etc. However, in many cases, the indexed map tiles, i.e., the map tiles specified by indexing to the reference map tile, need not include the zoom level identifier, the map view identifier or other information that is typically the same for all of the map tiles sent to display or that are associated with a particular single map image. This feature further reduces the information needed to be sent in the request for multiple map tiles.

Although, FIG. 6 illustrates a set of map tiles as a contiguous set of map tiles, the set of map tiles specified in a multi-tile request may include detached, or separated, map tiles. For example, in the case of new map labels or newly selected map layers, new map content may be needed at various separated points on a digital map. In such as case, a client device, such as client device 102, may generate a multi-tile request specifying various map tiles which are not adjacent. For example, a reference map tile may be arbitrarily, or otherwise, chosen and the remaining disjoint map tiles may be identified relative to the coordinates of the reference map tile.

Further, map tiles identified in a multi-tile request may include map tiles of various sizes, in an implementation. For example, the raster database 110 may include raster based map tiles of various sizes for displaying maps on various scales. In such a case, a multi-tile request may include an indication of zoom level or scale along with a reference map tile location and relative map tile locations. For example, a particular mapping application may display maps on one of eighteen map zoom levels, and a multi-tile request, generated by the mapping application, may include a number between one and eighteen to identify a relevant zoom or scale related to a geographic query.

Returning to FIG. 5, at a block 406, the multi-tile request is sent from a client device to a map content server, such as map content server 106. For example, the client device 150 may send the multi-tile request as a single HTTP request via the network interface 154. Then, at a block 408, individual map tiles, corresponding to the map tiles identified in the multi-tile request, are received from the map content server. The received tiles may include any of or a combination of raster image tiles, vector image tiles, and supplementary tiles, in an implementation. For example, a client device may receive supplementary tiles (e.g. including blurs, shading, textures, etc.) to blend with raster image tiles. In some implementations, the client device may receive only vector image tiles or only raster image tiles based on the nature of the geographic query or operation that triggered the multi-tile request. For example, a request for additional building information may trigger a request for vector based tiles and no raster based tiles.

At a block 410, a digital map is rendered for display based on the received map tiles. For example, the client device 102 may stitch, blend, overlay, or otherwise combine the received map tiles to generate a digital map for display on the display device 152. In some implementations, the client device 102 may receive the individual map tiles at various different times. In such as case, the client device 102 may display only portions of a digital map based on a subset of received map tiles. Then the client device 102 may display further portions of the digital map as more map tiles are received, for example.

Figure 7:
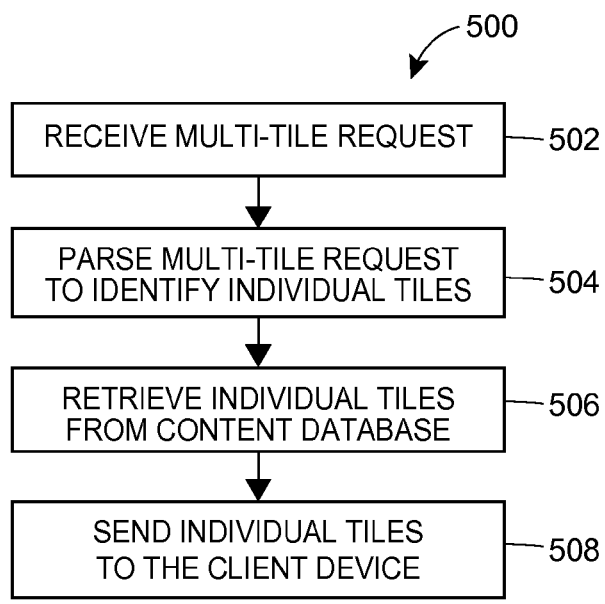
FIG. 7 is a flow diagram of an example method for generating and sending a multi-tile request from a client device to a server which can be implemented in the example computing environment illustrated in FIG. 1.

FIG. 7 is a flow diagram of an example method 450 for generating and sending a multi-tile request from a client device to a server which may be used in for example, the block 404 of FIG. 5. The example method 450 may be implemented in the client device 150 in any other manner, however.

At a block 452, a geographic region, for which new map tiles are needed, is determined. For example, the tile request routine 168 may process a geographic query to determine an area of interest. For example, if a user of the client device 150 enters a search query for "Chicago," via a user interface, the mapping application 164 may parse the search query, as known in the industry, to identify the region including the Chicago metropolitan area. In another scenario, a user of the client device 150 may zoom/pan from a view of a neighborhood of Chicago to a view of the whole Chicago metropolitan area. In such a scenario, the tile request routine 168 may determine map tiles needed for all of the Chicago metropolitan area but the geographic area of the currently viewed neighborhood.

Next (at a block 454), a particular set of map tiles, corresponding to the geographic area and zoom level for which a map is to be displayed, is determined. For example, the tile request routine 168 may determine the number and/or location of new map tiles by an amount of zoom or pan, a geographic scale of a geographic query (e.g. city scale, country scale, etc.), a bounding box of a digital map viewport, etc. The tile request routine 168 may determine that all map tiles fully or partially visible in a viewport, minus the map tiles currently being used by the mapping application 164, is the set of map tiles needed by the mapping application 164.

At a block 456, one of the set of map tiles identified at block 454 is selected as a reference map tile and is assigned a unique identifier. For example, the tile request routine 168 may select the map tile with the most central location in a current or expected map viewport, the map tile with a location closest to the average location of the set of map tiles as the reference map tile, the map tile at one corner of the entire geographical area for which map tiles are to be requested, etc. In some implementations, the tile request routine 168 may assign or determine the reference map tile a unique identifier in terms of latitude and longitude, or any other suitable coordinate system. For example, the coordinates corresponding to the reference map tile may indicate the latitude and longitude of the centroid of the map tile.

At a block 458, relative identifiers are determined and assigned to the remaining map tile in the particular set of map tiles. For example, the tile request routine 168 may assign the remaining map tiles positive and negative integer values representing the location of the map tiles relative to the reference map tile, as discussed further with reference to FIG. 5. In other implementations, the tile request routine 168 may assign relative coordinates to the remaining map tiles representing relative distances in a suitable unit, such as meters, feet, etc. For example, the tile request routine 168 may assign a map tile coordinates $(x_r, y_r)$, where $x_r$ and $y_r$ are the east/west distance and north/south distance between the centroid of the reference map tile and the map tile, respectively. In some cases, each of the other map tiles (e.g., the indexed map tiles) may be specified separately. In other cases, the other map tiles may be specified as a group with a group index, such as all map tiles within a certain distance or spacing from the reference map tile, all map tiles adjacent to the reference map tile, etc.

In some implementations, each of the set of map tiles is assigned a unique identifier that may be used to independently identify a map tile. For example, the client device 150 may assign absolute latitude and longitude coordinates, unique map tile identification numbers, or any other suitable unique identifiers, to each of the set of map tiles. In such implementations, blocks 456 and 458 of method 450 may be combined, such that unique identifiers are assigned to each of the set of map tiles. For example, the client device may assign a set of integer number identifiers, such as {(132, 124), (133, 124), . . . , (137, 128)}, to a set of map tiles, where each integer number identifier uniquely identifies one of the set of map tiles.

Next (at a block 460), a multi-tile request is generated including the coordinates of the reference map tile and the relative coordinates of the remaining map tiles, with each set of relative coordinates specifying either a single map tile or a group of map tiles, or including unique identifiers corresponding to each of the set of map tiles. For example, the multi-tile request may be an HTTP request may include a request line, headers, and an empty line, as known in the industry. The multi-tile request may include alphanumeric characters, symbols, or any other suitable representations of the coordinates of the reference map tile and remaining map tiles, for example. Then, at block 462, the multi-tile request is sent to a map content server, such as map content server 106. For example, the client device 150 may send the multi-tile request to the map content server 106 via the network interface 154.

Figure 8:
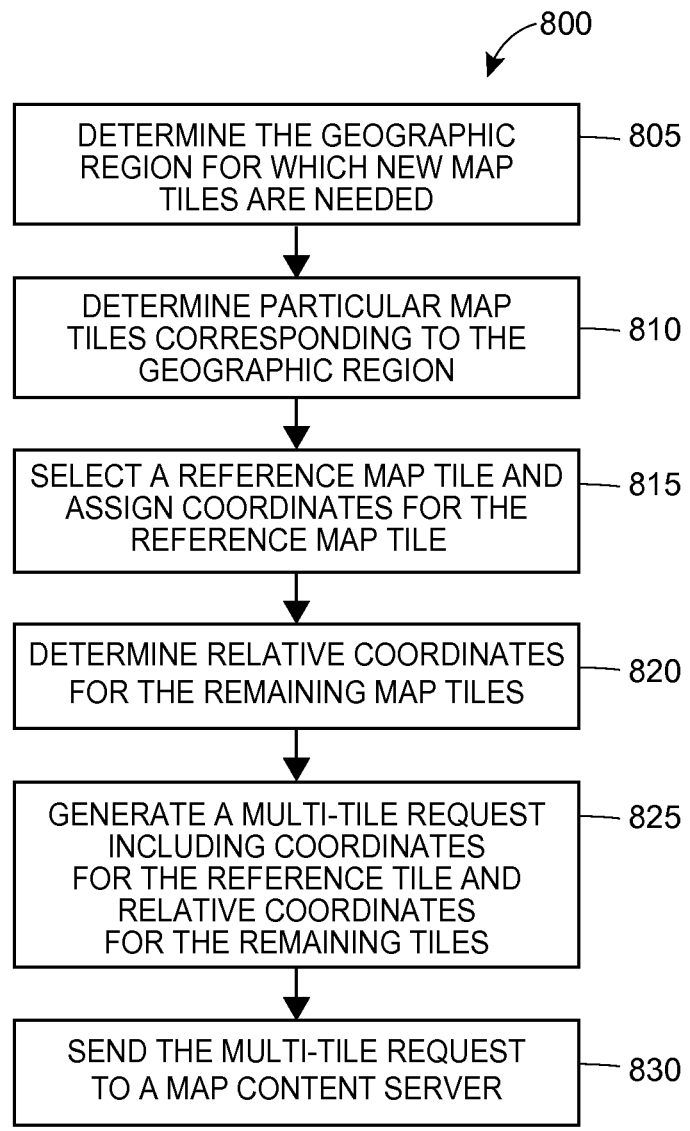
FIG. 8 is a flow diagram of an example method for servicing a multi-tile request from a client device which can be implemented in the example computing environment illustrated in FIG. 1.

FIG. 8 is a flow diagram of an example method 500 for servicing multi-tile requests received by a map content server. The method 500 may be implemented in the map content server 106, for example. Here, at a block 502, a multi-tile request is received from a client device. For example, the map content server 106 may receive the multi-tile request as a single HTTP request via the network 104. Subsequently, at a block 504, the multi-tile request is parsed to determine individual map tiles identified in the multi-tile request. For example, the parsing of the multi-tile request may include any of a number of parsing techniques known in the industry, such as identifying delimiters, generating signatures/grammars, etc. In some implementations, the map content server 504 may execute a series of computer-readable instructions, such as a parsing script, to parse the multi-tile request via known rules for a multi-tile request format. For example, the map content server 504 may execute a script that parses the multi-tile request based on integer numbers representing the width or increments of map tiles, where the integer numbers are known to exist at certain locations in a multi-tile request.

At a block 506, individual tiles, corresponding to the individual tiles identified in the multi-tile request, are retrieved from a content database. In some implementations, the map content server 106 may generate a database query, such as a SQL query or MapReduce function, corresponding to each of the map tiles identified in the multi-tile request. The map content server 106 may then execute the database queries on the raster database 110 or the vector database 108 and receive the map tiles as results of the queries.

In some implementations, the retrieving of the individual map tiles may be distributed across multiple processors. For example, after parsing the multi-tile request, the map content server 106 may distribute the retrieval of individual map tiles such that each map tile is retrieved from a database via a different processor. Further, a map content server may distribute the retrieval of raster and vector content to multiple processors such that the raster content corresponding to a certain map tile is retrieved by a different processor than the processor used to retrieve vector content corresponding to the certain map tile.

Next (at a block 508), the individual tiles retrieved from the content database are sent to the client device. In some implementations, the map content server 106 may send map tiles to the client device 102 as they are retrieved from the raster database 110 or the vector database 108. As such, the client device may begin to display portions of the digital map as new map tiles are available, for example. Alternatively, the map content server 102 may prioritize the communication of map tiles, in an implementation. For example, the map content server 102 may send raster content before vector content, map tiles for one geographic area before map tiles for another geographic area, map tiles most relevant to a query before less relevant map tiles, etc.

The techniques of the present disclosure utilize a single content request to fetch multiple map tiles. As such, the techniques of the present disclosure may significantly reduce communication overhead and prevent queued or stalled content requests in many scenarios. Moreover, a single content request may provide a map content server timely notification of requested content and allow the map content server to begin to fetch or generate all of the requested map tiles more quickly than if requests for individual map tiles are received in serially sent messages.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for efficient fetching of map tiles through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer-implemented method for fetching map tiles for digital maps, the method comprising:
   receiving, via a user interface, a request to display a digital map;
   identifying, with a processor, a plurality of map tiles each representing a portion of the digital map;
   generating a single map content request including multiple identifiers corresponding to the plurality of map tiles, including (i) a unique identifier for one of the plurality of map tiles and (ii) respective relative identifiers for the rest of the plurality of map tiles, each of the relative identifiers including integer increments to indicate positioning of the corresponding map tile relative to the uniquely identified map tile;
   communicating, via a computer network, the map content request to a server;
   in response to the map content request, receiving, via the computer network, the plurality of map tiles from the server; and
   displaying, via the user interface, the digital map based on the plurality of map tiles.

2. The computer-implemented method of claim 1, wherein the identifiers specify a multiplicity of non-adjacent map tiles.

3. The computer-implemented method of claim 1, wherein the unique identifier of the one of the plurality of map tiles includes latitude and longitude coordinates.

4. The computer-implemented method of claim 1, wherein each of the relative identifiers includes a first integer to specify a horizontal shift relative to the unique identifier map tile and a second integer to specify a vertical shift relative to the unique identifier map tile.

5. The computer-implemented method of claim 1, wherein the plurality of map tiles include rectangular portions of the digital maps making up a subdivision of the digital map.

6. The computer-implemented method of claim 1, wherein the single map content request is a hypertext transfer protocol (HTTP) request.

7. The computer-implemented method of claim 1, wherein the plurality of map tiles includes at least one of raster image map tiles or vector graphics map tiles.

8. The computer-implemented method of claim 7, wherein the plurality of map tiles includes at least one raster image map tile and the raster image map tile includes raster images of at least one of map shading, textures, backgrounds, roads, or natural geographic features.

9. The computer-implemented method of claim 7, wherein the plurality of map tiles includes at least one vector graphics map tile, wherein the vector graphics map tile includes geometric representations of building footprints, label positions, markers, or three-dimensional models.

10. The computer-implemented method of claim 1, wherein identifying a plurality of map tiles each representing a portion of the digital map includes identifying map tiles fully or partially within a current map viewport.

11. The computer-implemented method of claim 1, wherein identifying a plurality of map tiles each representing a portion of the digital map includes identifying map tiles corresponding to a geographic query.

12. The computer-implemented method of claim 1, wherein the identifying a plurality of map tiles each representing a portion of the digital map includes identifying map tiles associated with a zoom or pan operation.

13. The computer-implemented method of claim 1, wherein the one of the plurality of map tiles is a map tile with at least one of a central location in the plurality of map tiles or a central location in a map viewport.

14. A computer device for efficiently fetching map tiles, the computer device comprising:
one or more processors; and
one or more memories coupled to the one or more processors;
wherein the one or more memories include computer executable instructions stored therein that, when executed by the one or more processors, cause the one or more processors to:
receive, via a user interface, a request to display a digital map;
identify, with the one or more processors, a plurality of map tiles each representing a portion of the digital map;
generate a single map content request including multiple identifiers corresponding to the plurality of map tiles, including (i) a unique identifier for one of the plurality of map tiles and (ii) respective relative identifiers for the rest of the plurality of map tiles, each of the relative identifiers including integer increments to indicate positioning of the corresponding map tile relative to the uniquely identified map tile;
communicate, via a computer network, the map content request to a server;
in response to the map content request, receive, via the computer network, the plurality of map tiles from the server; and
display, via the user interface, the digital map based on the plurality of map tiles.

15. The computer device of claim 14, wherein the identifiers specify a multiplicity of non-adjacent map tiles.

16. The computer device of claim 15, wherein the set of relative identifiers includes multiple relative identifiers, each relative identifier specifying a single additional map tile.

17. The computer device of claim 15, wherein the set of relative identifiers includes a relative identifier specifying a group of additional map tiles.

18. The computer device of claim 17, wherein the group of additional map tiles is specified as a bounding box.

19. The computer device of claim 17, wherein the group of additional map tiles is specified so as to include those map tiles adjacent to the map tile specified by the unique identifier.

20. The computer device of claim 17, wherein the group of additional map tiles is specified so as to include those map tiles within a certain relative range of the map tile specified by the unique identifier.

21. A method in a network device for retrieving map tiles, the method comprising:
receiving, from a client device, a request for map data including a plurality of map tiles, wherein the request for map data includes multiple identifiers corresponding to the plurality of map tiles, the multiple identifiers including (i) a unique identifier for one of the plurality of map tiles and (ii) respective relative identifiers for the rest of the plurality of map tiles, each of the relative identifiers including integer increments to indicate positioning of the corresponding map tile relative to the uniquely identified map tile;
parsing, with one or more processors, the request for map data to identify the plurality of map tiles based on the unique identifier and the set of relative identifiers;
retrieving, with the one or more processors, the plurality of map tiles from a map content database; and
providing the requested map tiles to the client device.

22. The method of claim 21, wherein the identifiers specify a multiplicity of non-adjacent map tiles.

23. The method of claim 21, wherein the unique identifier of the one of the plurality of map tiles includes latitude and longitude coordinates.

24. The method of claim 21, wherein each of the relative identifiers includes a first integer to specify a horizontal shift relative to the unique identifier map tile and a second integer to specify a vertical shift relative to the unique identifier map tile.

25. The method of claim 21, wherein the parsing the request for map data includes:
identifying a plurality of entries in the request for map data; and
associating each of the plurality of entries in the request for map data with a particular map tile in the map content database.

26. The method of claim 25, wherein retrieving the plurality of map tiles includes:
generating a plurality of database queries each corresponding to a map tile in the map content database; and
executing the plurality of database queries to retrieve the plurality of map tiles from the map content database.

27. The method of claim 21, wherein retrieving the plurality of map tiles includes retrieving the plurality of map tiles from a raster content database and a vector content database.

28. A computer device for retrieving map tiles, the computer device comprising:
one or more processors; and
one or more memories coupled to the one or more processors;
wherein the one or more memories include computer executable instructions stored therein that, when executed by the one or more processors, cause the one or more processors to:
receive, from a client device, a request for map data including a plurality of map tiles, wherein the request for map data includes multiple identifiers corresponding to the plurality of map tiles, the multiple identifiers including (i) a unique identifier for one of the plurality of map tiles and (ii) respective relative identifiers for the rest of the plurality of map tiles, each of the relative identifiers including integer increments to indicate positioning of the corresponding map tile relative to the uniquely identified map tile;

parse, with one or more processors, the request for map data to identify the plurality of map tiles based on the unique identifier and the set of relative identifiers;

retrieve, with the one or more processors, the plurality of map tiles from a map content database; and provide the requested map tiles to the client device.

29. The computer device of claim 28, wherein the identifiers specify a multiplicity of non-adjacent map tiles.

* * * * *